US009334802B2

(12) United States Patent
Papa et al.

(10) Patent No.: US 9,334,802 B2
(45) Date of Patent: May 10, 2016

(54) GAS TURBINE ENGINE THERMAL MANAGEMENT SYSTEM

(71) Applicant: United Technologies Corporation, Hartford, CT (US)

(72) Inventors: Federico Papa, Ellington, CT (US); Thomas G. Phillips, Coventry, CT (US); Kathleen R. Phillips, Coventry, CT (US); Ethan K. Stearns, Lebanan, CT (US); Justin W. Heiss, East Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 509 days.

(21) Appl. No.: 13/799,406

(22) Filed: Mar. 13, 2013

(65) Prior Publication Data
US 2013/0202406 A1    Aug. 8, 2013

Related U.S. Application Data

(63) Continuation-in-part of application No. 13/285,454, filed on Oct. 31, 2011, now Pat. No. 8,495,857.

(51) Int. Cl.
*F02C 7/12* (2006.01)
*F01D 25/12* (2006.01)
(Continued)

(52) U.S. Cl.
CPC . *F02C 7/12* (2013.01); *F01D 25/12* (2013.01); *F02C 3/08* (2013.01); *F02C 7/06* (2013.01); *F02C 7/08* (2013.01); *F02C 7/14* (2013.01); *F02C 7/224* (2013.01); *F02C 7/232* (2013.01); *F02C 9/00* (2013.01); *F02C 9/48* (2013.01); *G05B 15/02* (2013.01); *G05D 7/06* (2013.01); *Y02T 50/675* (2013.01)

(58) Field of Classification Search
CPC ............... F02C 3/08; F02C 7/06; F02C 7/08; F02C 7/12; F02C 7/14; F02C 7/224; F02C 7/232; F02C 9/48; F01D 25/12; G05B 15/02; G05D 7/06
See application file for complete search history.

(56) References Cited

U.S. PATENT DOCUMENTS 3,287,906 A    11/1966  McCormick
4,020,632 A *   5/1977  Coffinberry .............. F02C 7/14
                                                    123/41.33

(Continued)

FOREIGN PATENT DOCUMENTS

EP         0248762 A2    12/1987
GB         1516041        6/1978
(Continued)

OTHER PUBLICATIONS

International Search Report and Written Opinion of the International Searching Authority for International application No. PCT/US2014/022288 dated Jul. 1, 2014.
First Search Report for Chinese Application No. 201210425927.0 dated Jun. 17, 2014.
Conference on Engineering and Physics: Synergy for Success 2006. Journal of Physics: Conference Series vol. 105. London, UK. Oct. 5, 2006.
(Continued)

*Primary Examiner* — Arun Goyal
(74) *Attorney, Agent, or Firm* — Carlson, Gaskey & Olds

(57) ABSTRACT

A thermal management system for a gas turbine engine according to an exemplary aspect of the present disclosure includes, among other things, a heat exchanger and a valve that controls an amount of a first fluid that is communicated through the heat exchanger A first sensor senses a first characteristic of a second fluid that is communicated through the heat exchanger to exchange heat with the first fluid and a second sensor senses a second characteristic of the second fluid. A positioning of the valve is based on at least one of the first characteristic and the second characteristic.

11 Claims, 2 Drawing Sheets

(51) Int. Cl.

| | | |
|---|---|---|
| *F02C 7/08* | (2006.01) | |
| *F02C 7/14* | (2006.01) | |
| *F02C 9/00* | (2006.01) | |
| *F02C 3/08* | (2006.01) | |
| *F02C 7/06* | (2006.01) | |
| *F02C 7/224* | (2006.01) | |
| *F02C 7/232* | (2006.01) | |
| *F02C 9/48* | (2006.01) | |
| *G05B 15/02* | (2006.01) | |
| *G05D 7/06* | (2006.01) | |

(56) References Cited

U.S. PATENT DOCUMENTS

| | | | |
|---|---|---|---|
| 4,041,697 | A | 8/1977 | Coffinberry et al. |
| 5,915,917 | A | 6/1999 | Eveker et al. |
| 6,223,616 | B1 | 5/2001 | Sheridan |
| 6,415,595 | B1 | 7/2002 | Wilmot, Jr. et al. |
| 7,260,926 | B2 | 8/2007 | Sabatino et al. |
| 7,765,788 | B2 | 8/2010 | Schwarz |
| 7,836,680 | B2 | 11/2010 | Schwarz et al. |
| 7,980,081 | B2 | 7/2011 | Mak |
| 7,984,606 | B2 * | 7/2011 | Smith ............ F02C 7/14 60/266 |
| 7,997,062 | B2 | 8/2011 | Sun et al. |
| 8,205,427 | B2 | 6/2012 | Schwarz et al. |
| 8,257,024 | B1 | 9/2012 | Phillips et al. |
| 8,261,527 | B1 | 9/2012 | Stearns et al. |
| 2004/0011052 | A1 | 1/2004 | Clements |
| 2007/0264133 | A1 | 11/2007 | Schwarz et al. |
| 2009/0313999 | A1 | 12/2009 | Hunter et al. |
| 2010/0148396 | A1 | 6/2010 | Xie et al. |
| 2010/0154427 | A1 | 6/2010 | Logan |
| 2010/0205977 | A1 | 8/2010 | Annigeri et al. |
| 2010/0242492 | A1 | 9/2010 | Sloat et al. |
| 2010/0313591 | A1 * | 12/2010 | Lents ............ F02C 7/10 62/259.2 |
| 2010/0331139 | A1 | 12/2010 | McCune |
| 2011/0023491 | A1 | 2/2011 | Rendo et al. |
| 2011/0252764 | A1 | 10/2011 | Smith |

FOREIGN PATENT DOCUMENTS

| | | |
|---|---|---|
| GB | 2041090 | 9/1980 |
| JP | 2006017039 A | 1/2006 |
| WO | 2006068832 A1 | 6/2006 |
| WO | 2007038674 | 4/2007 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case.

Hall, C.A. And Crichton, D. (2007). Engine design studies for a silent aircraft. Journal of Turbomachinery, 129, 479-487.

Haque, A. And Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. And Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Kie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed.) (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Nendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

* cited by examiner

GAS TURBINE ENGINE THERMAL MANAGEMENT SYSTEM

CROSS-REFERENCE TO RELATED APPLICATION

This application is a continuation-in-part of U.S. patent application Ser. No. 13/285,454, which was filed on Oct. 31, 2011.

BACKGROUND

This disclosure relates generally to a gas turbine engine, and more particularly to a gas turbine engine thermal management system that manages the heat generated by a gas turbine engine.

Gas turbine engines, such as turbofan gas turbine engines, generally include a fan section, a compressor section, a combustor section and a turbine section. During operation, airflow is pressurized in the compressor section and is mixed with fuel and burned in the combustor section. The hot combustion gases that are generated in the combustor section are communicated through the turbine section. The turbine section extracts energy from the hot combustion gases to power the compressor section, the fan section and other gas turbine engine loads.

A thermal management system can be employed within the gas turbine engine to manage the heat generated by the gas turbine engine. Thermal management systems maintain operable temperatures for the engine fuel, oil and other fluids that are communicated throughout the engine. For example, a portion of the heat of the engine oil can be transferred into the engine fuel to increase the efficiency of the gas turbine engine.

SUMMARY

A thermal management system for a gas turbine engine according to an exemplary aspect of the present disclosure includes, among other things, a heat exchanger and a valve that controls an amount of a first fluid that is communicated through the heat exchanger A first sensor senses a first characteristic of a second fluid that is communicated through the heat exchanger to exchange heat with the first fluid and a second sensor senses a second characteristic of the second fluid. A positioning of the valve is based on at least one of the first characteristic and the second characteristic.

In a further non-limiting embodiment of the foregoing system, a controller is operable to receive a signal from each of the first sensor and the second sensor.

In a further non-limiting embodiment of either of the foregoing systems, the controller modulates the valve to communicate the amount of the first fluid to the heat exchanger in response to at least one of the signal from the first sensor and the signal from the second sensor.

In a further non-limiting embodiment of any of the foregoing systems, the first characteristic includes temperature information and the second characteristic includes pressure information.

In a further non-limiting embodiment of any of the foregoing systems, the controller modulates the valve to communicate the amount of the first fluid to the heat exchanger in response to at least one of: altitude information, ambient temperature information, or engine power condition information.

In a further non-limiting embodiment of any of the foregoing systems, the first sensor senses a temperature of the second fluid after the second fluid exits the heat exchanger.

In a further non-limiting embodiment of any of the foregoing systems, the system comprises a pump, and the second sensor senses a flow rate of the second fluid through the pump.

In a further non-limiting embodiment of any of the foregoing systems, the first fluid is oil and the second fluid is fuel.

In a further non-limiting embodiment of any of the foregoing systems, the heat exchanger is part of a first fluid circuit that also includes a second heat exchanger and a third heat exchanger.

In a further non-limiting embodiment of any of the foregoing systems, the heat exchanger is incorporated into a second fluid circuit in addition to the first fluid circuit.

A gas turbine engine according to an exemplary aspect of the present disclosure includes, among other things, a thermal management system that includes a first fluid circuit and a second fluid circuit that manage heat generated in at least a portion of the gas turbine engine. A first heat exchanger is incorporated into each of the first fluid circuit and the second fluid circuit and a second heat exchanger is incorporated into the first fluid circuit. A valve controls an amount of a first fluid that is communicated to the first heat exchanger and the second heat exchanger. A controller is configured to control a positioning of the valve. The amount of the first fluid communicated to the first heat exchanger is based on a first characteristic of a second fluid and the amount of the first fluid communicated to the second heat exchanger is based on a second characteristic of the second fluid.

In a further non-limiting embodiment of the foregoing gas turbine engine, the first fluid circuit circulates oil.

In a further non-limiting embodiment of either of the foregoing gas turbine engines, the second fluid circuit circulates fuel.

In a further non-limiting embodiment of any of the foregoing gas turbine engines, a first sensor senses the first characteristic and a second sensor senses the second characteristic.

In a further non-limiting embodiment of any of the foregoing gas turbine engines, the first fluid circuit incorporates a third heat exchanger.

In a further non-limiting embodiment of any of the foregoing gas turbine engines, the first fluid circuit communicates a conditioned first fluid to at least one engine system and the second fluid circuit communicates a conditioned second fluid to at least a combustor section of the gas turbine engine.

A method of controlling a thermal management system of a gas turbine engine according to another exemplary aspect of the present disclosure includes, among other things, sensing a first characteristic of a first fluid, sensing a second characteristic of the first fluid, and controlling an amount of a second fluid that is communicated through a circuit of the thermal management system based on at least one of the first characteristic and the second characteristic.

In a further non-limiting embodiment of the foregoing method, the step of controlling includes closing a valve of the thermal management system to prevent the flow of the second fluid to a heat exchanger of the circuit during engine idle conditions.

In a further non-limiting embodiment of either of the foregoing methods, the step of controlling includes modulating a valve of the thermal management system to an intermediate position to communicate at least a portion of the second fluid to a heat exchanger of the circuit during engine cruise conditions.

In a further non-limiting embodiment of any of the foregoing methods, the step of controlling includes modulating a valve of the thermal management system to a fully open position to communicate the second fluid to a heat exchanger of the circuit during engine takeoff conditions.

The various features and advantages of this disclosure will become apparent to those skilled in the art from the following detailed description. The drawings that accompany the detailed description can be briefly described as follows.

DETAILED DESCRIPTION

Figure 1:
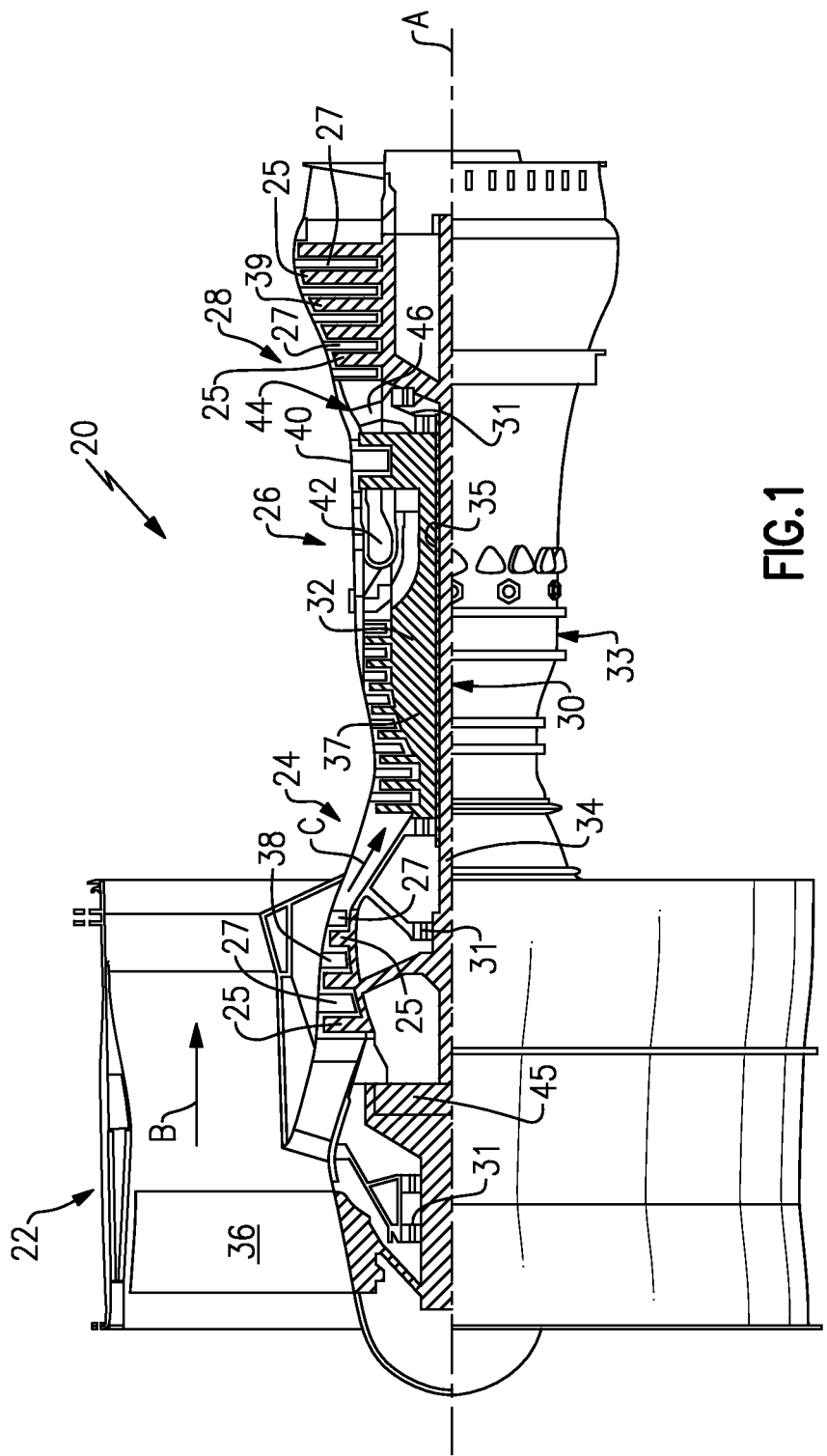
FIG. 1 schematically illustrates a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °\ R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Multiple sections of the gas turbine engine 20 generate heat during engine operation, including the fan section 22, the compressor section 24, the combustor section 26 and the turbine section 28. This heat may be carried by fluids that are communicated throughout these and other various sections of the gas turbine engine 20. For example, engine fuel and engine oil are circulated throughout the gas turbine engine 20 and carry a portion of the heat that is generated during engine operation. In this disclosure, the term "fluid" is intended to include fuel, oil, lubricating fluids, hydraulic fluids or any other fluids circulated through the gas turbine engine 20.

Figure 2:
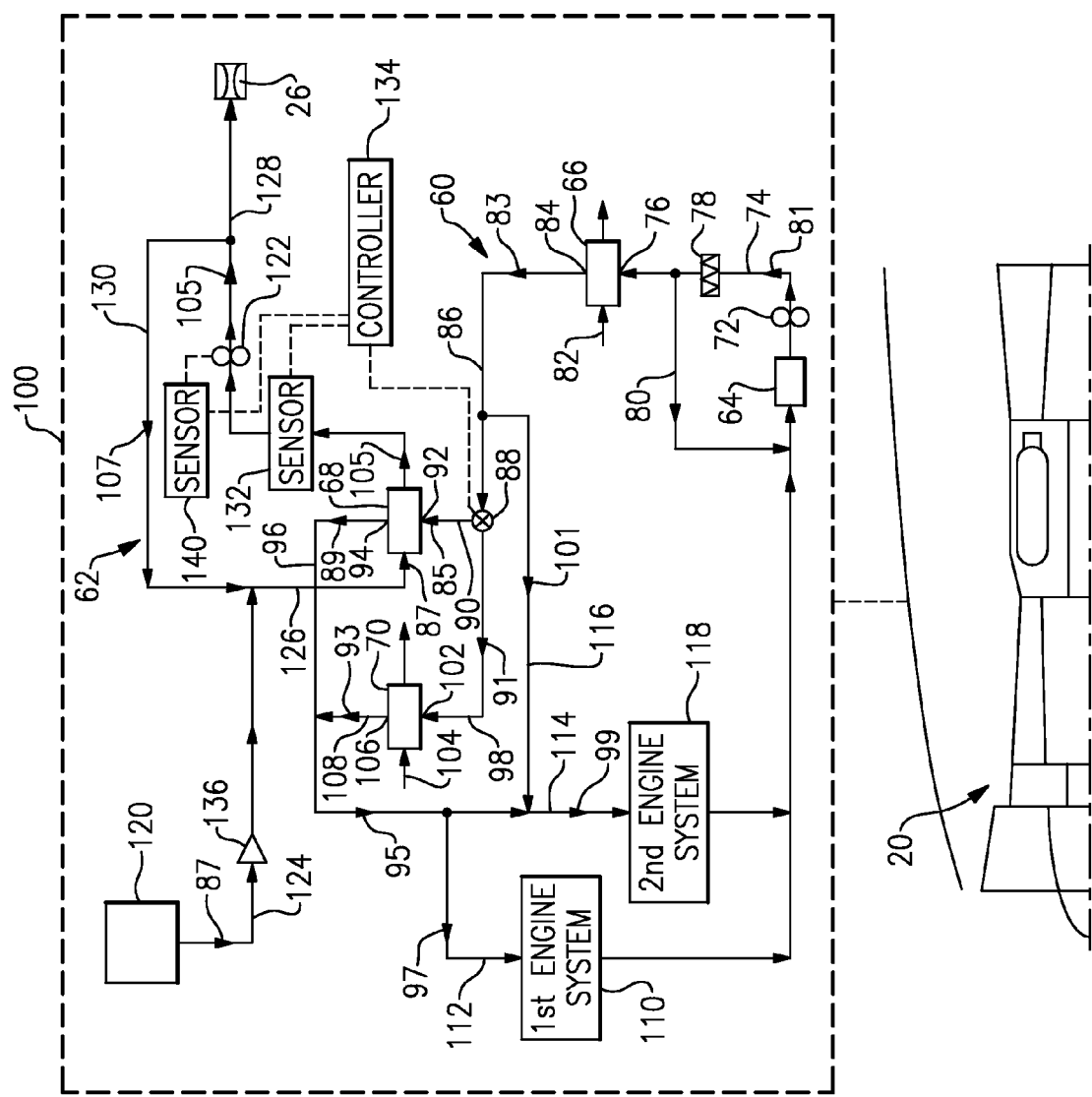
FIG. 2 illustrates an exemplary thermal management system for a gas turbine engine.

FIG. 2 illustrates a thermal management system 100 for a gas turbine engine, such as the gas turbine engine 20 illustrated by FIG. 1. The thermal management system 100 can manage the heat generated by the gas turbine engine 20 during its operation. The thermal management system 100 can communicate conditioned fluids to various engine systems of the gas turbine engine 20 to minimize this heat generation and dissipate the heat. For example, the thermal management system 100 can simultaneously deliver conditioned fluids having different temperatures to both low temperature systems and high temperature systems of the gas turbine engine 20, as is further discussed below. In this disclosure, the term "conditioned fluid" is intended to include heated, cooled and/or pressurized fluids. Of course, this view is highly schematic and is not necessarily shown to the scale it would be in practice.

The thermal management system 100 is mounted to the gas turbine engine 20. The mounting location of the thermal management system 100 is application specific. Non-limiting example mounting locations for the thermal management system 100 include the engine static structure 33 (see FIG. 1), a core compartment, a fan compartment, a bypass fan passage and other locations.

The thermal management system 100 includes a first fluid circuit 60 and a second fluid circuit 62. For example, the first fluid circuit 60 can circulate a first fluid 81, such as engine oil, and the second fluid circuit 62 can circulate a second fluid 87, such as engine fuel. It should be understood that other fluids in addition to oil and fuel are contemplated as within the scope of this disclosure. In combination, the first fluid circuit 60 and the second fluid circuit 62 transfer heat between the fluids communicated through the separate circuits 60, 62 to manage the temperatures of these fluids, as is further discussed below.

The first fluid circuit 60 incorporates a fluid tank 64, a first heat exchanger 66, a second heat exchanger 68, a third heat exchanger 70 and a pump 72. The pump 72 pumps a first fluid (indicated by arrow 81), such as oil, from the fluid tank 64 along a passage 74 to an inlet 76 of the first heat exchanger 66. Optionally, the first fluid circuit 60 can include a filter 78 for filtering the first fluid 81 prior to communicating the first fluid 81 to the inlet 76. Additionally, the first fluid circuit 60 can include a trim passage 80 for returning a portion of the first fluid 81 to the fluid tank 64 in the event an excess amount of the first fluid 81 is pumped from the fluid tank 64.

The first fluid 81 is communicated through the first heat exchanger 66 and exchanges heat with a different, third fluid 82, such as air, to condition the first fluid 81. In this example, the first heat exchanger 66 is an air/oil cooler that exchanges heat between oil and air. However, other types of heat exchangers can also be utilized. Heat from the first fluid 81 is transferred into the third fluid 82 to provide a first conditioned fluid 83 that exits an outlet 84 of the first heat exchanger 66.

The first conditioned fluid 83 is communicated along a passage 86 to a valve 88. The valve 88 controls the amount of the first conditioned fluid 83 that is communicated to the second heat exchanger 68 and the third heat exchanger 70. In one embodiment, the second heat exchanger 68 either receives an entirety of the first conditioned fluid 83 that is received by the valve 88, or receives only a portion thereof, as is further detailed below. In other words, the first and second heat exchangers 66, 68 are in continuous operation during operation of the thermal management system 100, but the third heat exchanger 70 is only selectively operated as required.

A first portion 85 of the first conditioned fluid 83 is communicated to an inlet 92 of the second heat exchanger 68 along a passage 90. The first portion 85 of the first conditioned fluid 83 is communicated through the second heat exchanger 68 and exchanges heat with the second fluid 87, such as fuel, that is circulated through the second fluid circuit 62. The second heat exchanger 68 renders a second conditioned fluid 89 which is communicated through an outlet 94 of the second heat exchanger 68 and into a passage 96.

To the extent the third heat exchanger 70 receives a portion of the first conditioned fluid 83 (discussed in greater detail below), a second portion 91 of the first conditioned fluid 83 can be communicated along a passage 98 to an inlet 102 of the third heat exchanger 70. The second portion 91 of the first conditioned fluid 83 is communicated through the third heat exchanger 70 and exchanges heat with yet another fluid 104, such as air, to render a third conditioned fluid 93 that exits the third heat exchanger 70 at outlet 106. The third conditioned fluid 93 from the third heat exchanger 70 is communicated along a passage 108 and is eventually communicated into the passage 96 such that the second conditioned fluid 89 from the second heat exchanger 68 and the third conditioned fluid 93 from the third heat exchanger 70 are mixed together to render a mixed conditioned fluid 95.

A first portion 97 of the mixed conditioned fluid 95 is communicated to a first engine system 110 along a passage 112. A second portion 99 of the mixed conditioned fluid 95 is communicated along passage 114 and is mixed with a third portion 101 of the first conditioned fluid 83 (communicated from the first heat exchanger 66 along a bypass passage 116 that extends between the first heat exchanger 66 and a second engine system 118) and is communicated to a second engine system 118. In this way, conditioned fluids having varying temperatures can be delivered to separate engine systems. For example, a mixture of the second portion 99 of the mixed conditioned fluid 95 and the third portion 101 of the first conditioned fluid 83 can include a greater temperature than the first portion 97 of the mixed conditioned fluid 95.

The first engine system 110 could include a portion of the geared architecture 48 of the fan section 22, such as journal bearings or other parts of the geared architecture 48. The second engine system 118 could include an engine bearing compartment, an engine gearbox or a drive mechanism of the geared architecture 48. Although only two engine systems are illustrated, it should be understood that additional or fewer engine systems can receive conditioned fluids from the thermal management system 100.

The second fluid circuit 62 of the thermal management system 100 includes a fluid tank 120, the second heat exchanger 68 (which is also incorporated into the first fluid circuit 60) and a pump 122. The second fluid circuit 62 can also optionally include a secondary pump 136.

The fluid tank 120 stores the second fluid 87 that is different from the first fluid 81 for use by the gas turbine engine 20. In one example, the second fluid 87 is fuel. The pump 122 pumps the second fluid 87 from the fluid tank 120 along a passage 124 and through the second heat exchanger 68 along a passage 126 to extract heat from the first portion 85 of the first conditioned fluid 83 that is communicated through the second heat exchanger 68 in the first fluid circuit 60. A conditioned second fluid 105 is delivered along a passage 128 to a portion of the gas turbine engine, such as the combustor section 26 for generating the hot combustion gases that flow to the turbine section 28. A portion 107 of the conditioned second fluid 105 can be returned to the passage 124 via a bypass passage 130.

The second fluid circuit 62 can also incorporate a sensor 132 (i.e., a first sensor), such as a temperature sensor or other suitable sensor. The sensor 132 monitors the temperature of the conditioned second fluid 105. The sensor 132 communicates with an engine controller 134. The engine controller 134 is programed with the necessary logic to interpret the information from the sensor 132, among other information, and modulate a positioning of the valve 88. The position of the valve 88 establishes what amount, if any, of the first conditioned fluid 83 will be communicated to the second and third heat exchangers 68, 70. In other words, the position of the valve 88 controls the amount of heat added to the second fluid 87 at different engine power conditions. Other valves, sensors and controls, examples of which are described below, could also be incorporated into the thermal management system 100.

In one example, the third heat exchanger 70 receives a portion of the first conditioned fluid 83 only if a temperature of the conditioned second fluid 105 of the second fluid circuit 62 is above a predefined threshold. In one example, the predefined threshold is approximately 300° F./148.9° C., although the actual setting will depend on design specific parameters. If the sensor 132 alerts the engine controller 134 (via a signal, for example) that this predefined threshold has been exceeded, the engine controller 134 modulates the valve 88 to split a flow of the first conditioned fluid 83 between the second heat exchanger 68 and the third heat exchanger 70. Of course, other parameters can also be monitored and interpreted by the engine controller 134 in addition to the temperature from sensor 132, and other predefined thresholds can be set for controlling the valve 88. The actual amount of the first conditioned fluid 83 that is communicated to each of the second and third heat exchangers 68, 70 will vary depending upon the parameters monitored by the engine controller 134.

In another example, the second fluid circuit 62 of the thermal management system 100 can incorporate an additional sensor 140 (i.e., a second sensor) that is configured to sense a different characteristic from the sensor 132. In one embodiment, the sensor 140 is a fluid flow sensor that senses the flow rate, which may be based on pressure differentials, of the conditioned second fluid 105 that passes through the pump 122. The sensor 140 monitors the flow rate of the conditioned second fluid 105 and can communicate flow rate information (i.e., pressure information) to the engine controller 134 for controlling a positioning of the valve 88. The engine controller 134 may be programed with the necessary logic to interpret the information from the sensor 140 and modulate a positioning of the valve 88.

For example, in addition to or in lieu of the information from the sensor 132, a positioning of the valve 88 can be controlled based on the flow rate information sensed by the sensor 140 to control what amount, if any, of the first conditioned fluid 83 will be communicated to the second and/or third heat exchangers 68, 70. In another embodiment, the amount of the first conditioned fluid 83 communicated to the second heat exchanger 68 is based on the flow rate information sensed by the sensor 140 (i.e., a first characteristic of the conditioned second fluid 105) and the amount of the first conditioned fluid 83 communicated to the third heat exchanger 70 is based on the temperature information sensed by the sensor 132 (i.e., a second characteristic of the conditioned second fluid 105).

In one non-limiting embodiment, the thermal management system 100 can be controlled similar to the following schedule. In response to the sensor 140 sensing relatively low flow of the conditioned second fluid 105, such as during engine idle conditions, the engine controller 134 may close the valve 88 to prevent the flow of the first conditioned fluid 83 to the second and/or third heat exchangers 68, 70. Alternatively, when the sensor 140 senses median flow of the conditioned second fluid 105, such as during engine cruise conditions, the valve 88 may be modulated to an intermediate position (in response to a command from the engine controller 134) to communicate at least a portion of the first conditioned fluid 83 to the second and/or third heat exchangers 68, 70. Finally, in response to the sensor 140 sensing relatively high flow of the conditioned second fluid 105, such as during engine takeoff conditions, the valve 88 may be modulated to a fully open position to communicate an increased amount of the first conditioned fluid 83 through the first and/or second heat exchangers 68, 70.

The schedule for controlling the positioning of the valve 88 is not intended to be limited to one that is a function of fluid temperature and/or pressure. Rather, the schedule for controlling the positioning of the valve 88 may be a function of other characteristics, including but not limited to, altitude information, ambient temperature information, and engine power condition information.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a thermal management system that includes a first fluid circuit and a second fluid circuit that manage heat generated in at least a portion of the gas turbine engine;
a first heat exchanger incorporated into a first branch of said first fluid circuit and said second fluid circuit;
a second heat exchanger incorporated into a second branch of said first fluid circuit;
a valve configured to that controls aft a first amount of a first fluid that is communicated to said first heat exchanger and a second amount of said first fluid that, is communicated to said second heat exchanger; and
a controller configured to control a positioning of said valve, wherein said first amount of said first fluid communicated to said first heat exchanger is based on a first characteristic of a second fluid and said second amount of said first fluid communicated to said second heat exchanger is based on a second characteristic of said second fluid.

2. The gas turbine engine as recited in claim 1, wherein said first fluid circuit circulates oil.

3. The gas turbine engine as recited in claim 1, wherein said second fluid circuit circulates fuel.

4. The gas turbine engine as recited in claim 1, comprising a first sensor that senses said first characteristic and a second sensor that senses said second characteristic.

5. The gas turbine engine as recited in claim 1, wherein said first fluid circuit incorporates a third heat exchanger.

6. The gas turbine engine as recited in claim 1, wherein said first fluid circuit communicates a conditioned first fluid to at least one engine system and said second fluid circuit communicates a conditioned second fluid to at least a combustor section of the gas turbine engine.

7. A method of controlling a thermal management system of a gas turbine engine, comprising:
sensing a first characteristic of a first fluid;
sensing a second characteristic of the first fluid;
controlling a first amount of a second fluid that is communicated through a first heat exchanger of the thermal management system based on the first characteristic of the first fluid; and
controlling a second amount of the second fluid that is communicated through a second heat exchanger of the thermal management system based on the second characteristic of the first fluid.

8. The method as recited in claim 7, wherein the step of controlling the first amount includes closing a valve of the thermal management system to prevent the flow of the second fluid to the first heat exchanger during engine idle conditions.

9. The method as recited in claim 7, wherein the step of controlling the first amount includes modulating a valve of the thermal management system to an intermediate position to communicate the first amount of the second fluid to the first heat exchanger during engine cruise conditions.

10. The method as recited in claim 7, wherein the step of controlling the first amount includes modulating a valve of the thermal management system to a fully open position to communicate the first amount of the second fluid to the first heat exchanger during engine takeoff conditions.

11. A thermal management system for a gas turbine engine, comprising: a first heat exchanger;
a second heat exchanger positioned in parallel with said first heat exchanger;
a valve configured to independently control flow of a first fluid to each of said first heat exchanger and said second heat exchanger;
a first sensor configured to sense a first characteristic of a second fluid that is communicated through said first heat exchanger for exchanging heat with said first fluid;
a second sensor configured to sense a second characteristic of said second fluid; and
a controller configured to control a positioning of said valve based on said first characteristic and said second characteristic.

* * * * *